US011516335B2

(12) United States Patent
Agrawal et al.

(10) Patent No.: US 11,516,335 B2
(45) Date of Patent: *Nov. 29, 2022

(54) PERSONALIZABLE UI COMPONENT LAYOUT ON CURVED GLASS

(71) Applicant: Motorola Mobility LLC, Chicago, IL (US)

(72) Inventors: Amit Kumar Agrawal, Bangalore (IN); Zhengping Ji, Hinsdale, IL (US); Olivier David Rene Meirhaeghe, Lincolnshire, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,377

(22) Filed: Jan. 21, 2020

(65) Prior Publication Data

US 2021/0227071 A1 Jul. 22, 2021

(51) Int. Cl.
*H04M 1/72448* (2021.01)
*G06F 9/451* (2018.01)
*H04M 1/02* (2006.01)

(52) U.S. Cl.
CPC ........ *H04M 1/72448* (2021.01); *G06F 9/451* (2018.02); *H04M 1/0268* (2013.01)

(58) Field of Classification Search
CPC ........... A63F 2300/6027; G06F 3/0481; G06F 3/017; G06F 3/0488; G06F 2203/04808;
(Continued)

(56) References Cited

U.S. PATENT DOCUMENTS

| 7,454,698 B2 | 11/2008 | Kohda et al. |
| 8,050,550 B2 | 11/2011 | Misawa |

(Continued)

FOREIGN PATENT DOCUMENTS

| JP | 2015531955 | 11/2015 |
| WO | 2019047738 | 3/2019 |

OTHER PUBLICATIONS

"Galazy 2& Edge: How do I add Tasks Edge", Samsung Support; https://www.samsung.com/levant/support/mobile-devices/galaxy-s7-edge-how-do-i-add-tasks-edge/; Exact publication date unknown but believed to be prior to filing of present application; Viewed online Apr. 13, 2021.

(Continued)

*Primary Examiner* — Jennifer N Welch
*Assistant Examiner* — K C Chen

(57) ABSTRACT

Systems and methods are provided for generating a personalizable user interface (UI) component layout on a curved screen on a mobile electronic communication device, the curved screen having a front screen display surface and a plurality of edge screen display surfaces. In an example, the described technique entails detecting that a device user has opened an application on the mobile electronic communication device, determining whether the application opened by the user supports placement of UI components on edge screen display surfaces, and determining a coverage area on the front screen display surface and the edge screen display surfaces areas when the application supports placement of UI components on edge screen display surfaces, and estimating a user hand size based on the determined coverage area, and placing one or more UI components on an edge screen display surface to be reached by the user based on the estimated hand size.

17 Claims, 13 Drawing Sheets

(58) Field of Classification Search
CPC .. G06F 9/451; G06F 3/0418; H04M 1/72448; H04M 1/0268; H04M 1/0269; H04M 1/0266; H04M 2250/22
See application file for complete search history.

(56) References Cited

U.S. PATENT DOCUMENTS

| | | | |
|---|---|---|---|
| 8,217,904 | B2 | 7/2012 | Kim |
| 8,514,196 | B2 | 8/2013 | Kim |
| 8,519,971 | B1 | 8/2013 | Mackraz |
| 8,769,431 | B1 | 7/2014 | Prasa et al. |
| 9,134,846 | B2 | 9/2015 | Lee et al. |
| 9,389,703 | B1 | 7/2016 | Olsen et al. |
| 9,405,458 | B2 | 8/2016 | Urushihata |
| 9,509,361 | B1 | 11/2016 | Kuhl et al. |
| 9,924,050 | B2 | 3/2018 | Sugimoto |
| 10,089,004 | B2 | 10/2018 | Urushihata |
| 10,620,825 | B2 | 4/2020 | Liu |
| 10,813,193 | B1 | 10/2020 | Agrawal |
| 2010/0066763 | A1 | 3/2010 | Macdougall et al. |
| 2010/0302155 | A1* | 12/2010 | Sands ................. G06F 3/04886 345/163 |
| 2011/0161866 | A1 | 6/2011 | Rainisto |
| 2012/0182239 | A1 | 7/2012 | Urushihata |
| 2014/0232653 | A1* | 8/2014 | Yagihashi ............ G06F 3/0346 345/158 |
| 2015/0199092 | A1 | 7/2015 | Kuscher et al. |
| 2015/0365306 | A1 | 12/2015 | Chaudhri et al. |
| 2016/0062515 | A1 | 3/2016 | Bae et al. |
| 2016/0337503 | A1 | 11/2016 | Wang |
| 2017/0123638 | A1 | 5/2017 | Yamada et al. |
| 2017/0161006 | A1 | 6/2017 | Kwon |
| 2017/0269812 | A1 | 9/2017 | Luo et al. |
| 2017/0289338 | A1* | 10/2017 | Riva ..................... G06F 9/4843 |
| 2018/0307270 | A1 | 10/2018 | Pantel |
| 2018/0341570 | A1 | 11/2018 | Yu |
| 2019/0020760 | A1* | 1/2019 | DeBates ................ H04M 3/42 |
| 2019/0325847 | A1 | 12/2019 | Kong et al. |
| 2020/0057525 | A1* | 2/2020 | Prest ..................... H04R 1/028 |
| 2022/0229623 | A1* | 7/2022 | Huang ............... G06F 3/04886 |

OTHER PUBLICATIONS

"Oppo Shows off 'waterfall screen' phone with ultra-curved edges", Published on The Verge Jul. 29, 2019; https://www.theverge.com/circuitbreaker/2019/7/29/8934593/oppo-waterfall-display-phone-curved-screen-announced ; Viewed online Apr. 13, 2021.

"Use Edge Lighting on you Galaxy Phone", Samsung Support; https://www.samsung.com/us/support/answer/ANS00077671/ ; Exact Publication date unknown but believed to be prior to filing of present application; Viewed online Apr. 13, 2021.

"What is Edge Lighting and How do I use it?", Samsung Support; https://www.samsung.com/uk/support/mobile-devices/what-is-edge-lighting/ ; Unknown exact publication date but believed to be prior to filing of present application; Viewed online Apr. 13, 2021.

Lee, Gene , "Notice of Allowance", U.S. Appl. No. 16/748,177, filed Jan. 21, 2020; dated Dec. 3, 2020.

Tran, Thuy V. , "Notice of Allowance", U.S. Appl. No. 16/748,149, filed Jan. 21, 2020; dated Jun. 12, 2020.

Wang, Yuehan , "NonFinal OA", U.S. Appl. No. 16/748,101, filed Jan. 21, 2020; dated Jan. 1, 2021.

Wu, Yana , "Notice of Allowance", U.S. Appl. No. 16/748,204, filed Jan. 21, 2020; dated Feb. 3, 2021.

\* cited by examiner

PERSONALIZABLE UI COMPONENT LAYOUT ON CURVED GLASS

TECHNICAL FIELD

The present disclosure is related generally to mobile electronic communications devices and, more particularly, to systems and methods for personalization of a UI (User Interface) component layout on a mobile electronic communications device having a curved display surface.

BACKGROUND

As the use of portable cellular devices becomes ever more deeply ingrained in society, device makers seek new avenues through which to provide interesting features to users. This quest has led to devices having interesting functions as well as interesting constructions. As to the latter, in particular, there have been attempts to interest users in devices having display surfaces that droop or curve down onto the lateral edges of the device. However, to date, such attempts have been unsuccessful.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussions of technology in this Background section is reflective of the inventors' own observations, considerations, actions and/or thoughts, and are in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
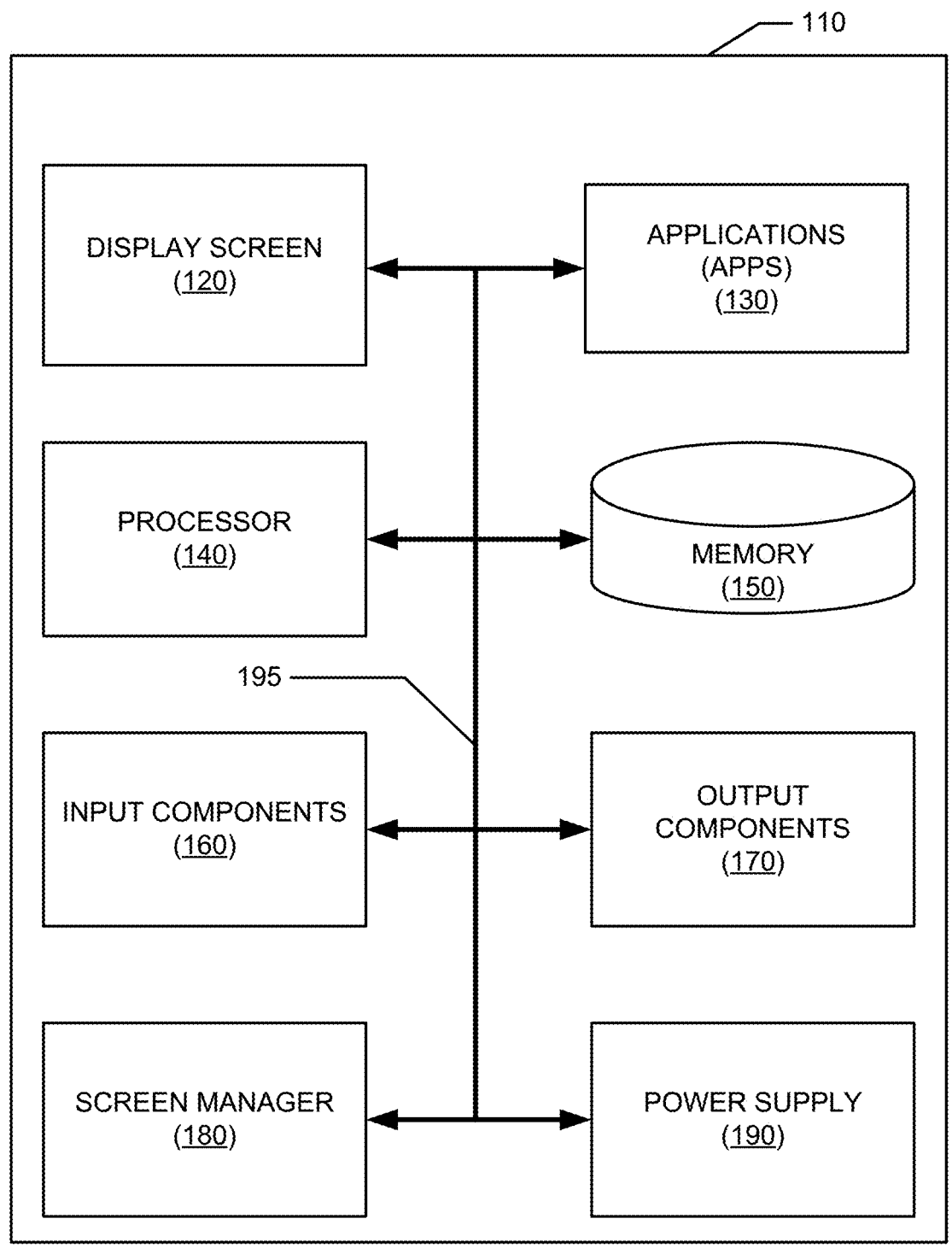
FIG. 1 is a general schematic representation of a mobile electronic device in which various embodiments of the disclosed principles may be implemented.

Before presenting a detailed discussion of embodiments of the disclosed principles, an overview of certain embodiments is given to aid the reader in understanding the later discussion. As noted above, attempts to produce commercially acceptable mobile electronic devices with curved glass have not been successful. It would appear that this failure is largely due to functional issues, and in particular, the lack of appropriate content and behavior handling at the edge portions of the display.

For example, if curved display edges are simply a continuation of the central portion of the display, then they become a screen portion that it is not only more difficult to see but also more easily mishandled when the user is holding the device. Similarly, in postures where one or more edges face away from, or only slightly towards, the user, information shown on such edges may be essentially invisible to the user. Compounding this factor, and the issue of accidental activation of edge material, a user's handedness and particular hold will also affect visibility and handling of edges.

In an embodiment of the disclosed principles, a mobile communications device such as a cellular phone manages notification via a curved display surface when hand-held by determining a direction in which the device is being held relative to the user. Using this information, the device is able to determine whether the notification should be displayed on an edge portion of the display or on the front-facing portion of the display. If the notification is to be displayed on an edge portion of the display, the device determines which of the multiple edge portions should be utilized by determining which edge is covered by the user's hand or palm. If at least one edge is not covered by a hand or palm, the notification is provided on the uncovered edge.

If both edges (or all edges if there are more than two edge display portions) are covered by the user's hand or palm, then the device determines which particular areas of the edges are covered and provides the notification on the edge that is less covered by the user's hand or palm. The preferred edge for displaying such notifications may be changed when the user switches the device from one hand to another or changes the way the device is being held.

In yet another embodiment of the disclosed principles, the mobile communications device is configured to selectively operate an edge flashlight based on user location and device orientation. In particular, in this embodiment, the device includes an ordinary back plane LED (light emitting diode) flashlight which may also be used as a flash for the device camera. In addition, an edge flashlight is provided using the material of the screen itself.

The user may access a menu setting to select which flashlight to turn on in a given situation. However, the user may also turn the flashlight function on using a gesture, a spoken command, or other non-menu-based command. In this case, the device is configured to determine which flashlight to use. To this end, the device determines the direction in which the device is being held by the user, e.g., if the back camera flashlight is facing toward or away from the user.

If the back camera is facing away from the user, as it would when the user is holding the device vertically in front of their face, the device enables the back camera flashlight. However, if the back camera flashlight is facing toward the user, the device enables the edge screen flashlight.

In this case, however, the device also determines where on the edge to generate the edge screen flashlight. If the device has two screened edges, the device generates the edge screen flashlight on the edge that is facing substantially away from the user. If the device has more screened edges, e.g., 4 such edges, the device may generate the edge screen flashlight on the two facing substantially away from the user.

In the event that the user switches the device from one hand to another, or otherwise changes the device posture, the decision process may be repeated in order to more appropriately face the flashlight for the new posture. In a further embodiment, the device is configured such that the user can enable or disable light on one particular edge, e.g., via a UI, gesture, and so on.

In a further embodiment of the disclosed principles, the mobile electronic communications device is configured to extend the display of content onto the device edge screen areas. To this end, the device determines the type of content being displayed, and whether it is suitable for full screen display on the front and edges of the primary screen or on a secondary display. The device then determines if there are any actionable UI elements (that is, elements such as menus and controls that are selectable to cause a further action by the device) that would appear on one or more device edge screen areas when the content is extended to cover the edge screen areas. The device also determines whether the user's hand is covering any part of the edge screen area.

For content determined to be suitable for extension, the device extends the content to the edge screen area where no actionable elements would be moved onto an edge and where there is no user hand coverage. By way of example, the content extension can include, but is not limited to, the scaling of video/image to extend onto edge screen areas, the extension of the UI onto the edge screen area, and so on.

In another embodiment of the disclosed principles, when the device is resting face down on a table or other substantially horizontal surface, the device may employ a proximity sensor and gyroscope, for example, to determine where to display notifications. Thus, for example, if the user is detected in a certain direction with respect to the device, the device displays the notification on the device edge display portion that is most directly facing the user. If it cannot be determined where the user is, the device may display the notification on both edges in a two-edge device, or on all edges in a three- or four-edge device.

In a further embodiment, with respect to the management of notifications when the device is face down, the device may be configured to determine, upon detection of proximate persons, if at least one user is authenticated as the owner of the device. This may be accomplished via voice identification (e.g., via audio beamforming) and thermal sensors.

In this embodiment, if no identified user is an owner of the device, then the device does not display anything with respect to a received notification. If instead, one of the identified persons is authenticated as the owner of the device, then the device provides a notification display on an edge visible to the authenticated user. If the device is instead placed by the user on a table or other surface in a screen-up orientation, the device determine the user's viewing angle and the side which may be covered due to placement on the table and then provides a notification on the side of the device which is being viewed by the user based on the device position.

In another embodiment, the device is configured to allow personalization of the layout of virtual sliders, buttons and other actionable UI components with respect to the device edge screen area. To this end, the device determines that given the current display, the device has touch enabled display regions in the edge screen area. If the device is being held by a user's hand covering part of the edge screen area while a portion of the edge screen area remains uncovered, the device determines, based on the holding position, user's viewing position and user's hand size, the areas on the uncovered portion of the edge screen area where the user can most easily tap a thumb or other finger. The device then customizes the layout of one or more actionable UI components in the areas on the uncovered portion of the edge screen area where the user can most easily tap. If such a UI component is then touched, the device completes the action associated with such UI component.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Thus, for example, while FIG. 1 is a simplified electrical schematic drawing illustrating components of an example mobile electronic communications device with respect to which embodiments of the disclosed principles may be implemented, it will be appreciated that other device types may be used, including but not limited to laptop computers, tablet computers, and so on. It will be appreciated that additional or alternative components may be used in a given implementation depending upon user preference, component availability, price point and other considerations.

In the illustrated embodiment, the components of the user device 110 include a touch sensitive display screen 120 that includes one or more edge screen areas (e.g., on two lateral edges, top and bottom edges, or some combination of any of the foregoing). The user device 110 also includes applications (e.g., programs) 130, a processor 140, a memory 150, one or more input components 160 such as RF input facilities or wired input facilities, including, for example one or more antennas and associated circuitry and logic. The antennas and associated circuitry may support any number of protocols, e.g., WiFi, Bluetooth, different generations of cellular service, e.g., 4G, 5G, etc.

The device 110 as illustrated also includes one or more output components 170 such as RF (radio frequency) or wired output facilities. The RF output facilities may similarly support any number of protocols, e.g., WiFi, Bluetooth, cellular including 5G, etc., and may be the same as or overlapping with the associated input facilities. It will be appreciated that a single physical input may serve for both transmission and receipt.

The processor 140 can be a microprocessor, microcomputer, application-specific integrated circuit, or other suitable integrated circuit. For example, the processor 140 can be implemented via one or more microprocessors or controllers from any desired family or manufacturer. Similarly, the memory 150 is a nontransitory media that may (but need not) reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code (e.g., applications 130) associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to the described embodiments.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a screen manager 180 is included to execute some or all of the functions associated with the behaviors described herein with respect to screen edge area utilization. In an embodiment, a power supply 190, such as a battery or fuel cell, is included for providing power to the device 110 and its components. Additionally or alternatively, the device 110 may be externally powered, e.g., by a vehicle battery, wall socket or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display.

Figure 2:
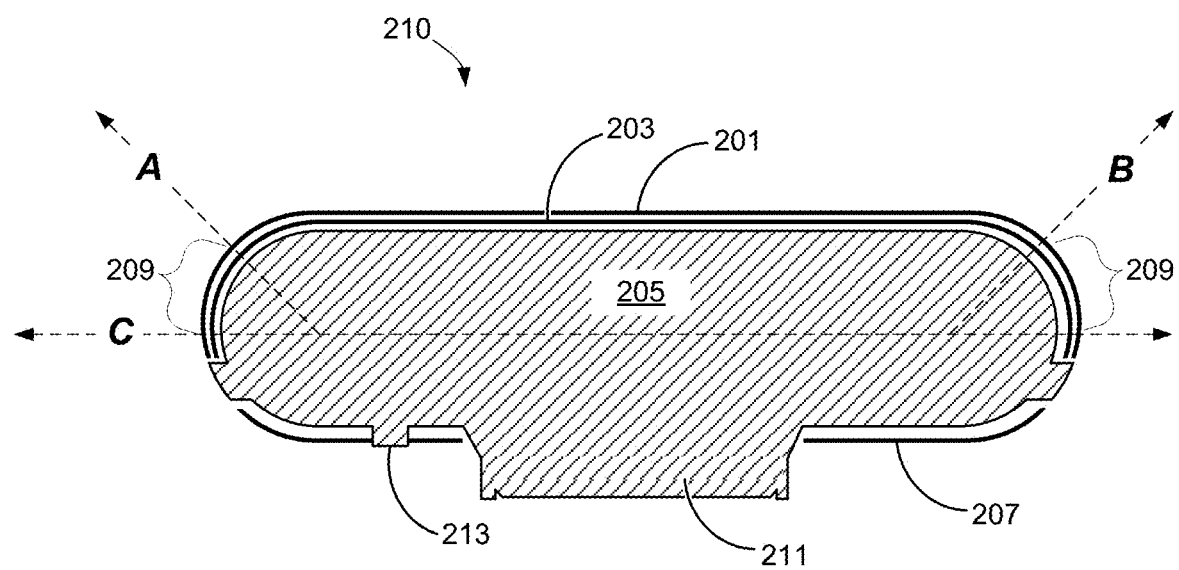
FIG. 2 is a top cross-sectional view of a device having the components shown schematically in FIG. 1 in accordance with an embodiment of the disclosed principles.

Turning to FIG. 2, this figure is a top cross-sectional view of a device 210 having the components shown schematically in FIG. 1 (110). As can be seen, the device 210 includes lens 201 as well as a touch-sensitive screen 203. The lens 201 covers the touch-sensitive screen 203, while still allowing a finger touch on the lens 201 to be sensed by the touch-sensitive screen 203. The internal components of the device 210 are grouped as element 205, including, but not requiring, a camera 211, flash 213 or other element protruding through the back cover 207 of the device 210.

The touch-sensitive screen 203 includes primarily a front facing portion as well as one or more edge portions 209. The lens 201 is similarly configured as it overlays the screen 203. Together, the lens 201 and display 203 may be referred to as the display assembly. Since the display assembly is curved at the edges, it is difficult and unnecessary to define an exact point where the primary display area stops and the edge display area begins. However, in the illustrated embodiment, the normal rays A, B passing through the 45 degree tangent points of the display assembly are used to define the separation between the primary or frontal display area and the edge display areas 209. The device 210 horizontal plane C is shown for orientation.

Figure 3:
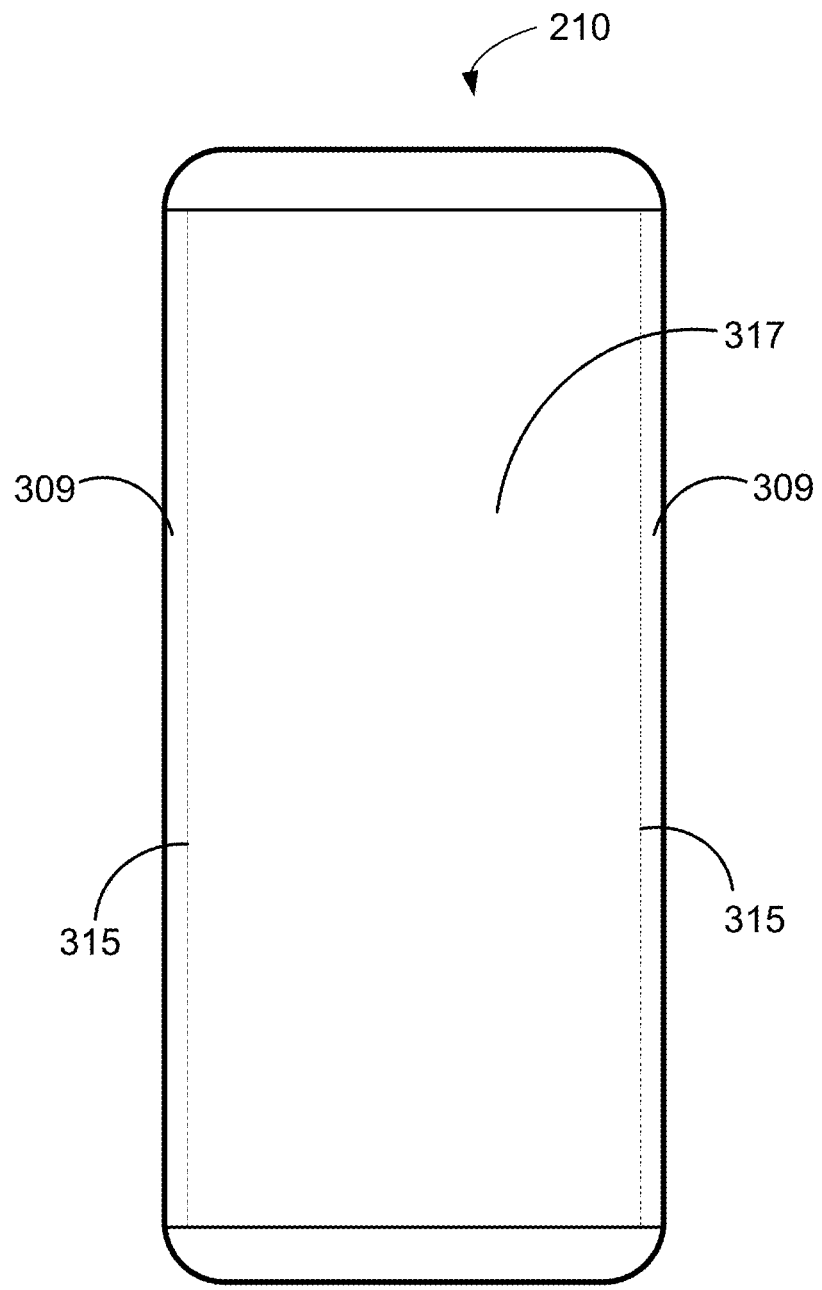
FIG. 3 is a simplified front view of the device of FIG. 2 when lateral edge screen areas are included in accordance with an embodiment of the disclosed principles.
Figure 4:
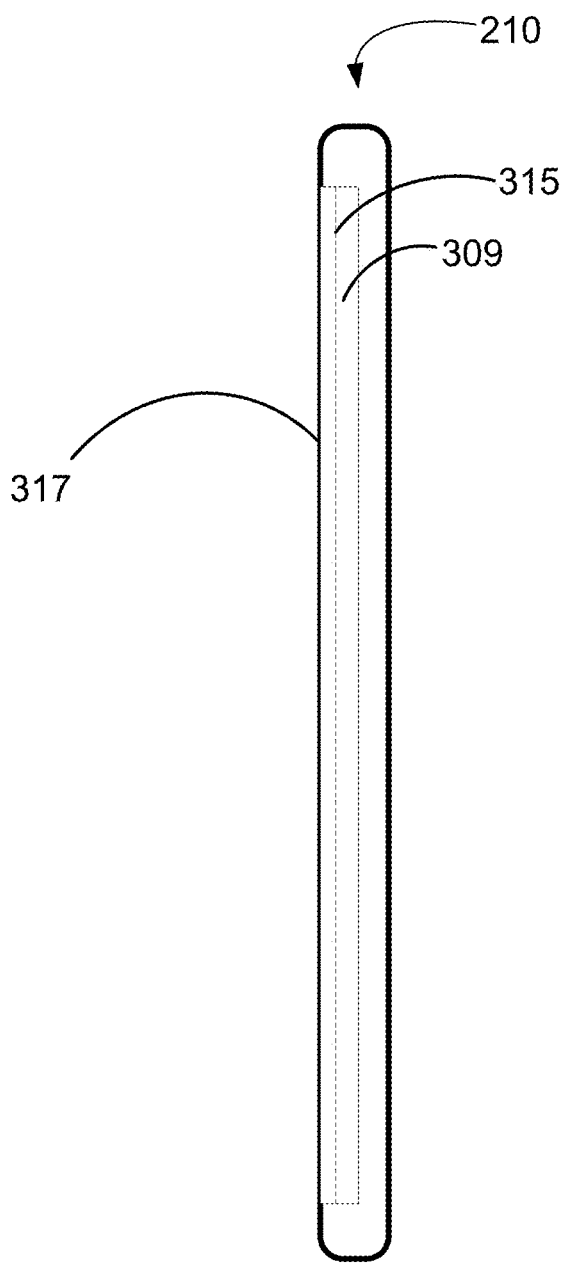
FIG. 4 is a side view of the device of FIG. 2 in the same configuration shown in FIG. 3 in accordance with an embodiment of the disclosed principles.

FIG. 3 is a simplified front view of the device 210 when 2 lateral edge screen areas 309 are included. The light lines 315 are virtual, and are simply included to show a possible delineation between the frontal display area 317 and the lateral edge screen areas 309. FIG. 4 is a side view of the device 210 in the same configuration shown in FIG. 3.

Figure 5:
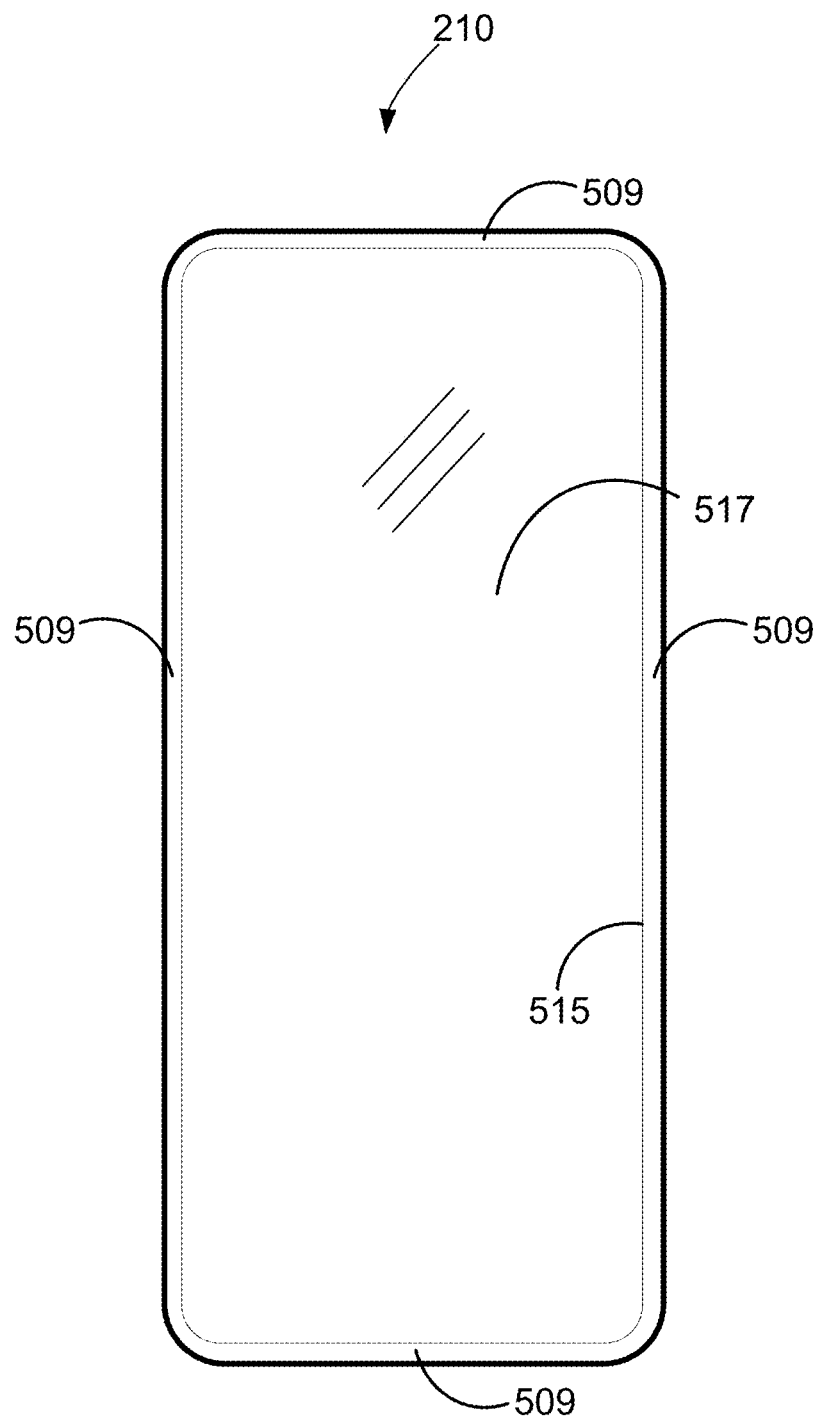
FIG. 5 is a simplified front view of the device of FIG. 2 when 4 lateral edge screen areas are included in accordance with an embodiment of the disclosed principles.
Figure 6:
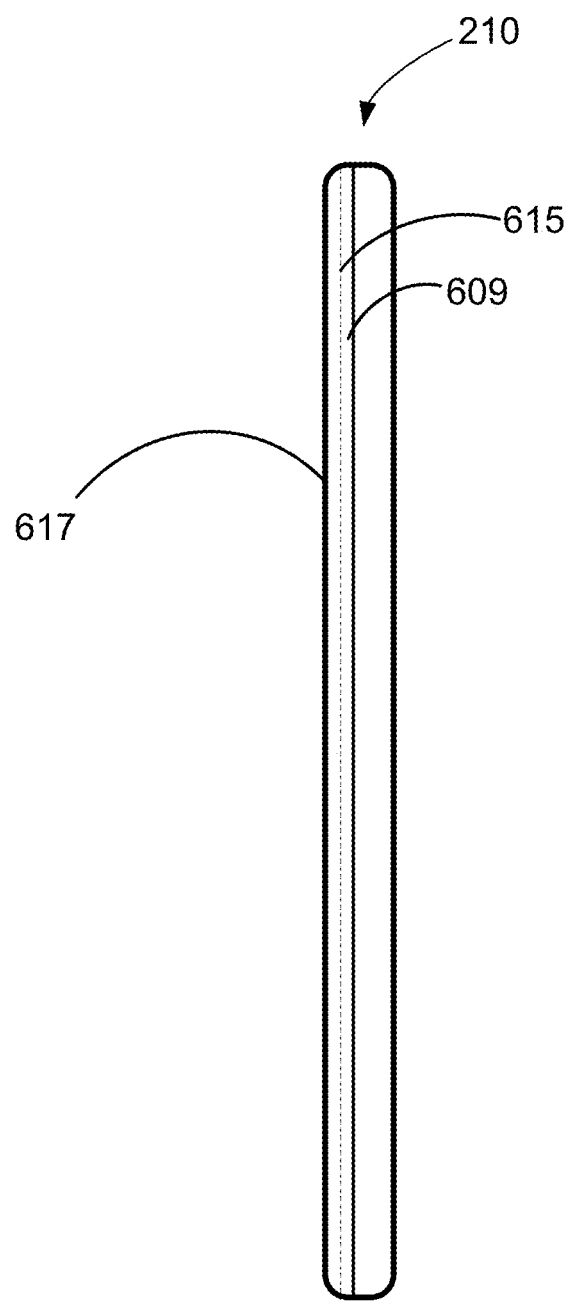
FIG. 6 is a side view of the device of FIG. 2 in the same configuration shown in FIG. 5 in accordance with an embodiment of the disclosed principles.

Similarly, FIG. 5 is a simplified front view of the device 210 when 4 lateral edge screen areas 509 are included. The light outline 515 is virtual, and is included to show a possible delineation between the frontal display area 517 and the lateral edge screen areas 509. FIG. 6 is a side view of the device 210 in the same configuration shown in FIG. 5.

Figure 7:
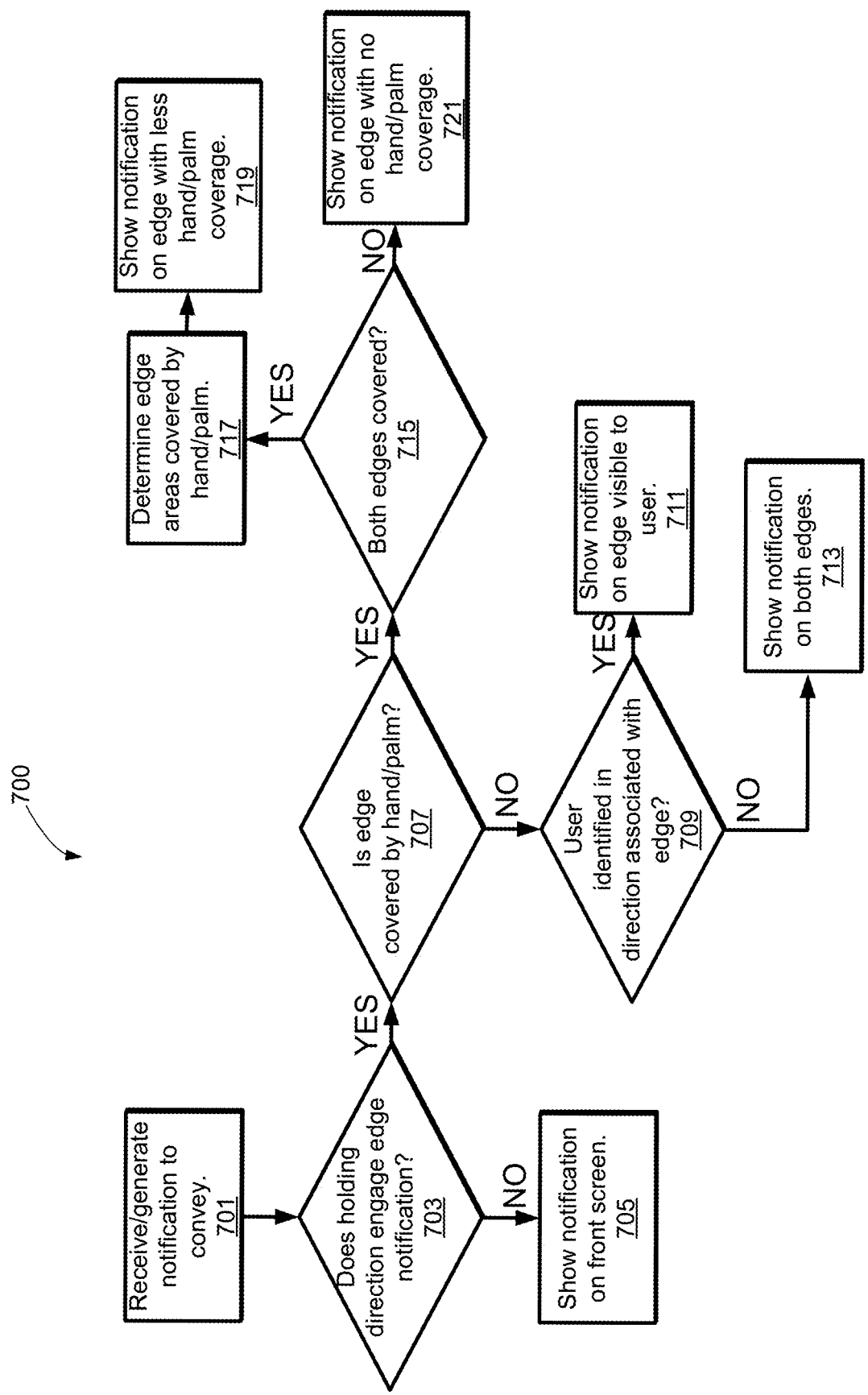
FIG. 7 is a flowchart showing a process of notification management within a portable electronic device having multiple edge screen areas in accordance with an embodiment of the disclosed principles.

FIG. 7 is a flowchart showing a process of notification management within a portable electronic device having multiple edge screen areas such as shown in FIGS. 2-6 for example. At stage 701 of the process, the device receives or generates a notification to be conveyed to a user of the device. The device detects the holding direction (or viewing angle) of the device and at stage 703 determines whether the holding direction allows edge notification (that is, display of the notification on an edge screen area of the device).

If the holding direction does not allow notification in an edge screen area, for example, where the edge screens are only on two sides and user is holding the phone vertically, the device displays the notification on the front screen (e.g., in the top or bottom areas).

Otherwise, the process flows to stage 707, wherein the device determines whether the edge screens are covered, to any extent by the user's hand or palm. If the edge screens are not covered, and the user is in a known direction (stage 709), the device displays the notification on the edge facing the user at stage 711. Otherwise, if the user direction is not known (stage 709), the displays the notification on all edges at stage 713.

If at stage 707 it was determined that the edge screen areas were covered to some extent by the user's hand or palm, then the device determines at stage 715 whether there is coverage on both (all) edges, and if so, determines the relative areas covered at stage 717, displaying the notification on the edge with the least coverage at stage 719. If it is instead determined at stage 715 that there is an edge with no coverage, the device displays the notification on that edge at stage 721.

Figure 8:
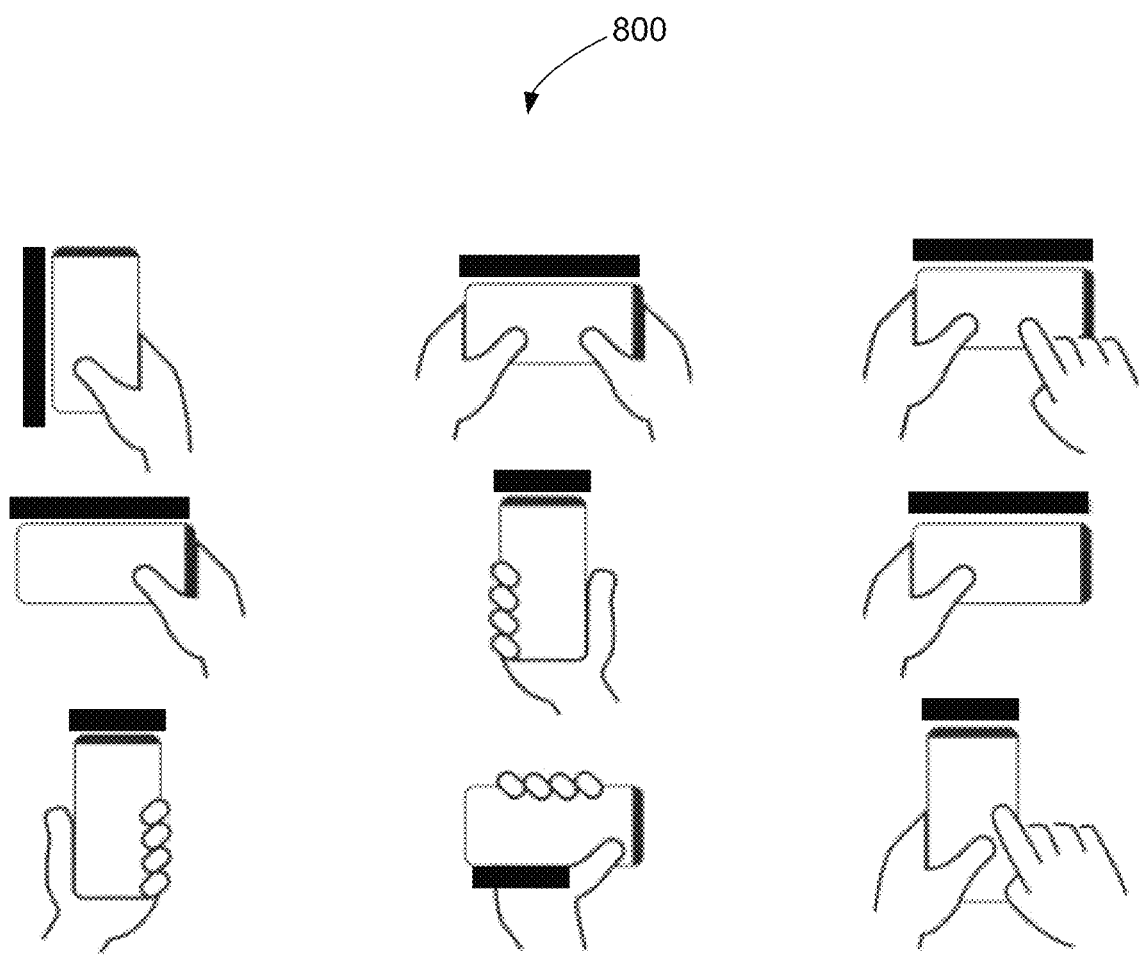
FIG. 8 shows an array of possible usage scenarios in keeping with the process of FIG. 7 in accordance with an embodiment of the disclosed principles.

An array 800 of possible usage scenarios stemming from the process 700 is shown in FIG. 8. The black bar by the device in each scenario indicates the edge or edge area used to provide the notification visually to the user. As can be seen, the disclosed technique of basing notification area on holding orientation, hand/palm coverage and user viewing direction enhances the user's edgeless experience with the curved display, reduces false touch on the edge screen areas and allows more effective better notification to the user by more effectively using the edge screen areas.

As noted above, in another embodiment, the device is configured to efficiently and selectively extend content onto the edge screen areas of the device (e.g., areas 509 of FIG. 5). In general, for content determined to be suitable for extension, the device extends the content to the edge screen area where there are no actionable elements on an edge and where there is no user hand coverage on an edge. By way of example, the content extension can include, but is not limited to, the scaling of video/image to extend onto edge screen areas, the extension of the UI onto the edge screen area, and so on.

Figure 9:
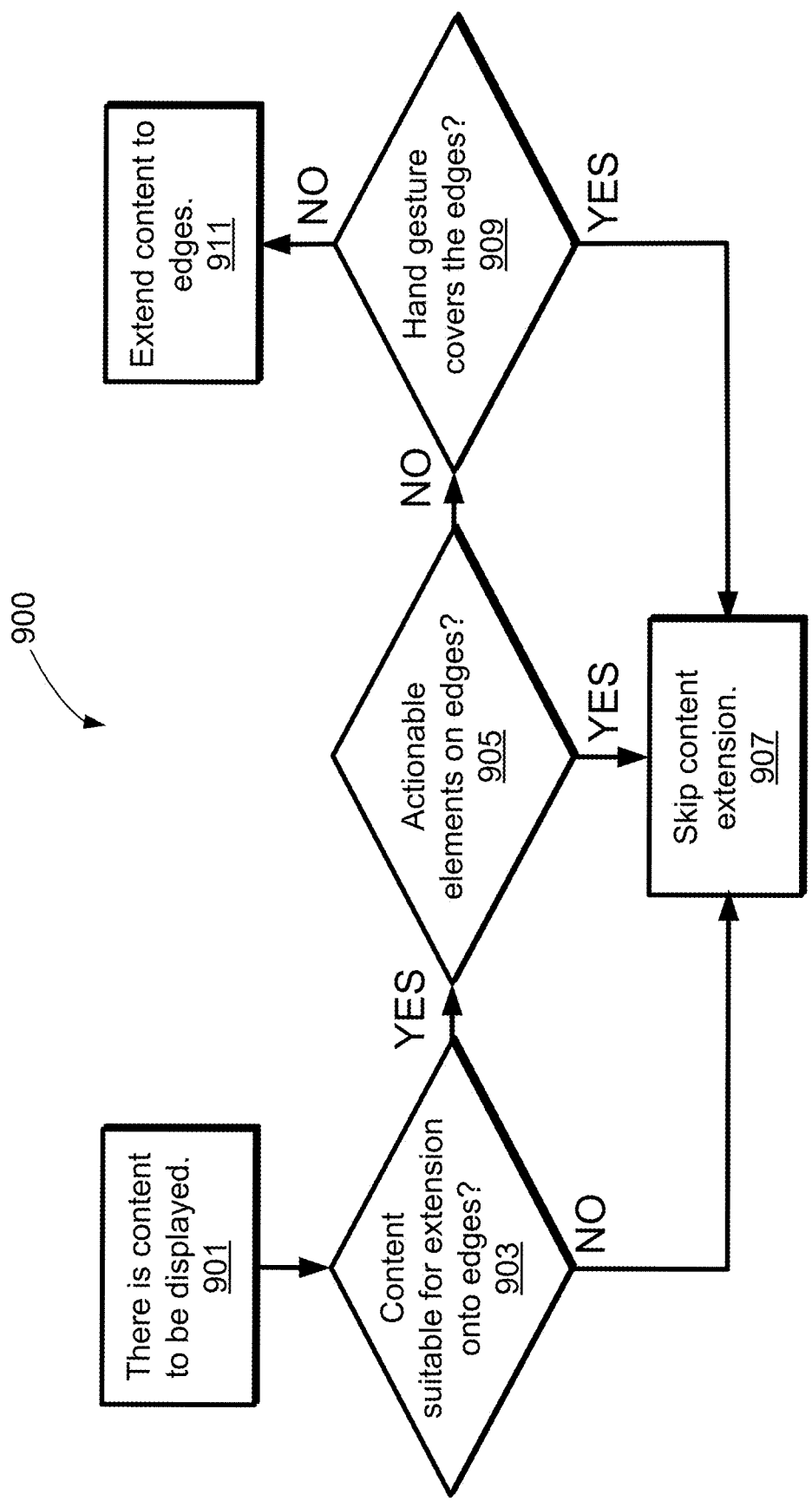
FIG. 9 is a flow chart showing a process for managing the extension of displayed content onto the edge screen areas of a device in accordance with an embodiment of the disclosed principles.
Figure 10:
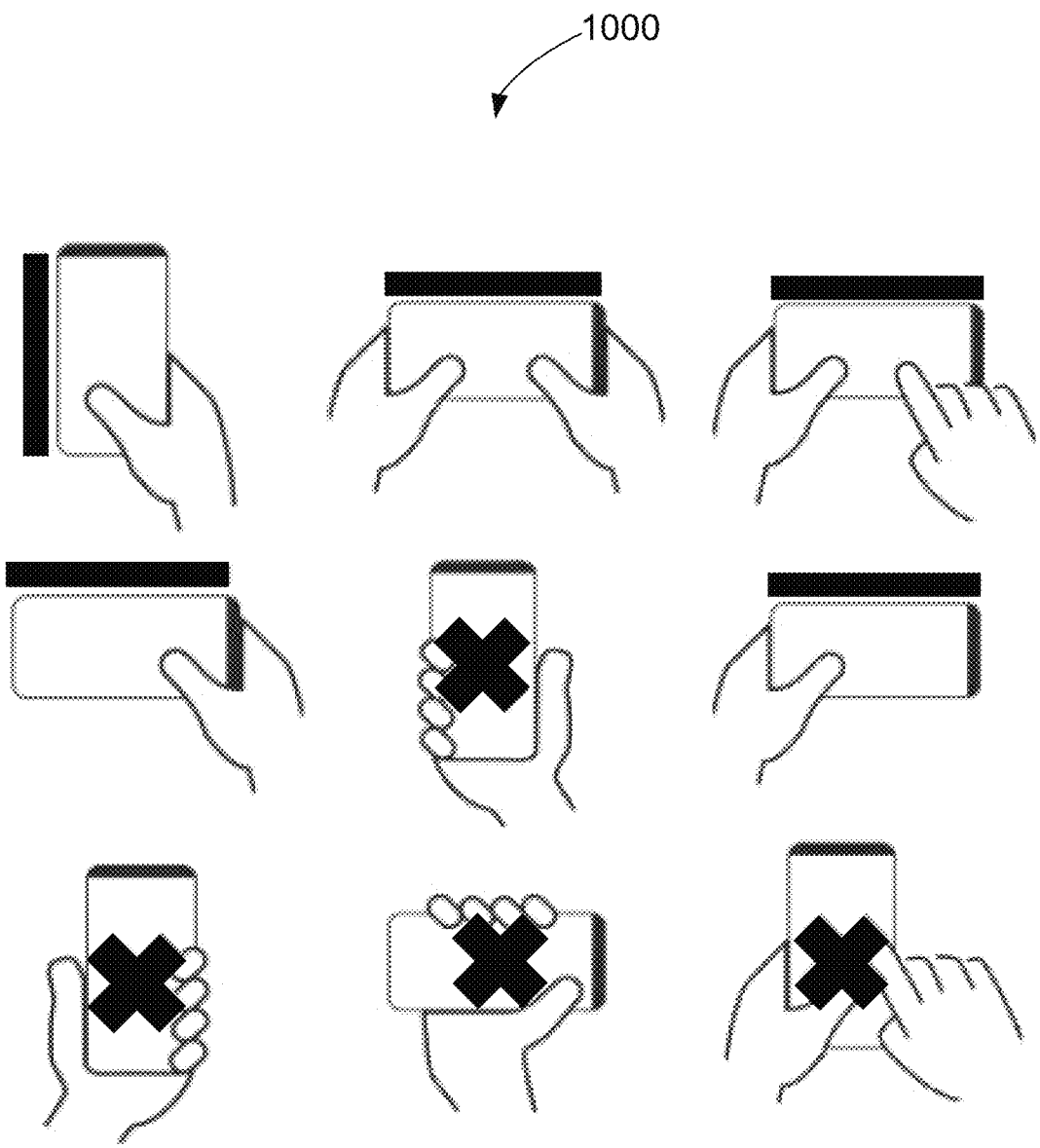
FIG. 10 shows an array of possible usage scenarios in keeping with the process of FIG. 9 in accordance with an embodiment of the disclosed principles.

Turning to a more detailed example, FIG. 9 shows a flow chart of a process 900 for managing the extension of displayed content onto the edge screen areas of the device 210. At stage 901 of the process 900, the device determines that there is content to be displayed to the user.

The device then determines at stage 903 whether the content is suitable for extension onto the edges. Content suitable to extend to the edge screen areas can be videos, images etc. to provide an edgeless experience. For example, when a user views YOUTUBE in a full screen mode, the video material may extend to the edge screen areas. However, some content is less suitable for edge screen extension. For example, for a user browsing the web or reading an e-book, text that goes onto the edge screen areas would become harder to read.

If it is determined that the content is not suitable for extension onto the edges, then the device skips content extension at stage 907. Otherwise, the process 900 flows to stage 905, wherein it determines whether extension would conflict with actionable elements on the device edges. If so, the device again terminates content extension at stage 907. Otherwise, the process 900 flows to stage 909, wherein the device determines whether the user's hand covers the edges. If the user's hand is determined to be covering the edges, the device again terminates content extension at stage 907. Otherwise, the process flows to stage 911, wherein the content to be displayed is extended to the device edges (edge screen areas). In this way, the device 210 is able to deliver enhanced user edgeless experience, better UI and reduced false touches in edge regions by basing extension on content suitability, UI actionable elements and hand interference.

In a further embodiment of the described principles, the device is configured to efficiently and effectively convey notifications when the device 210 has been placed face down on a flat surface such as a table top. The notifications may include new notifications, timed alarms, calls and emergency messages. In an embodiment, the user may mute, snooze (delay) or silence (dismiss) such notifications with an edge gesture without having to flip the device and indeed without necessarily even touching the device. In an embodiment, when the device screen is on or the device is face up, ANDROID standard (notifications, full screen intent) or PEEK DISPLAY notification is used instead of edge screen lighting indicators.

Figure 11:
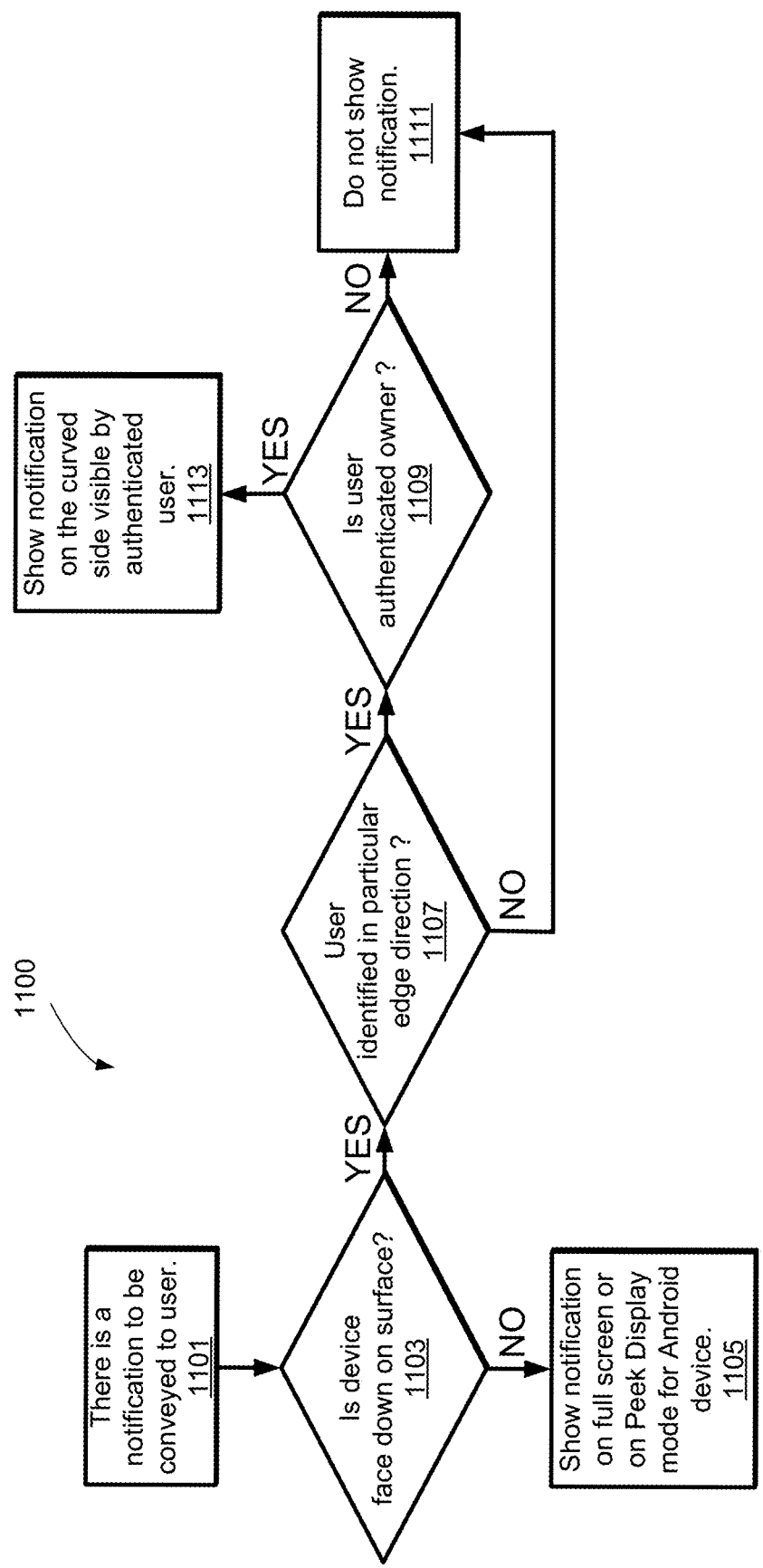
FIG. 11 is a flow chart showing a process for managing notifications when a device such as the device of FIG. 2 is placed on a flat surface such as a table top in accordance with an embodiment of the disclosed principles.

Turning to FIG. 11, this figure shows a flow chart of a process 1100 for managing notifications when a device such as device 210 is placed on a flat surface such as a table top. At stage 1101, the device detects or generates a notification to be conveyed to user. The device then determines at stage 1103 whether the device is face down on the surface. In the event that the device is not face down, the device shows the notification on the full screen or in PEEK DISPLAY mode for Android devices at stage 1105.

Otherwise, the process 1100 flows to stage 1107, wherein the device determines if a user has been identified in a particular edge direction. If no such user has been identified, the process flows to stage 1111 wherein the device skips display of the notification. Otherwise, the process flows to stage 1109 to determine if the identified user is the authenticated owner, for example using back cameras for face recognition. If so, the device shows the notification on the edge screen region visible to the user. Otherwise, the device again skips display of the notification at stage 1111.

As noted above, a typical camera flash flashlight requires the user to hold the device in an unnatural manner, however, having the device screen extended onto the device edges allows the alternative use of edge lighting for flashlight purposes. In an associated embodiment of the disclosed principles, the mobile communications device is configured to selectively operate an edge flashlight based on user location and device orientation. In particular, in this embodiment, the device includes an ordinary back plane LED flashlight which may also be used as a flash for the device camera. In addition, an edge flashlight is provided using the material of the screen itself.

The user may access a menu setting to select which flashlight to turn on in a given situation. However, the user may also turn the flashlight function on using a gesture, a spoken command, or other non-menu-based command. In this case, the device is configured to determine which flashlight to use. To this end, the device determines the direction in which the device is being held by the user, e.g., if the back camera flashlight is facing toward or away from the user.

Figure 12:
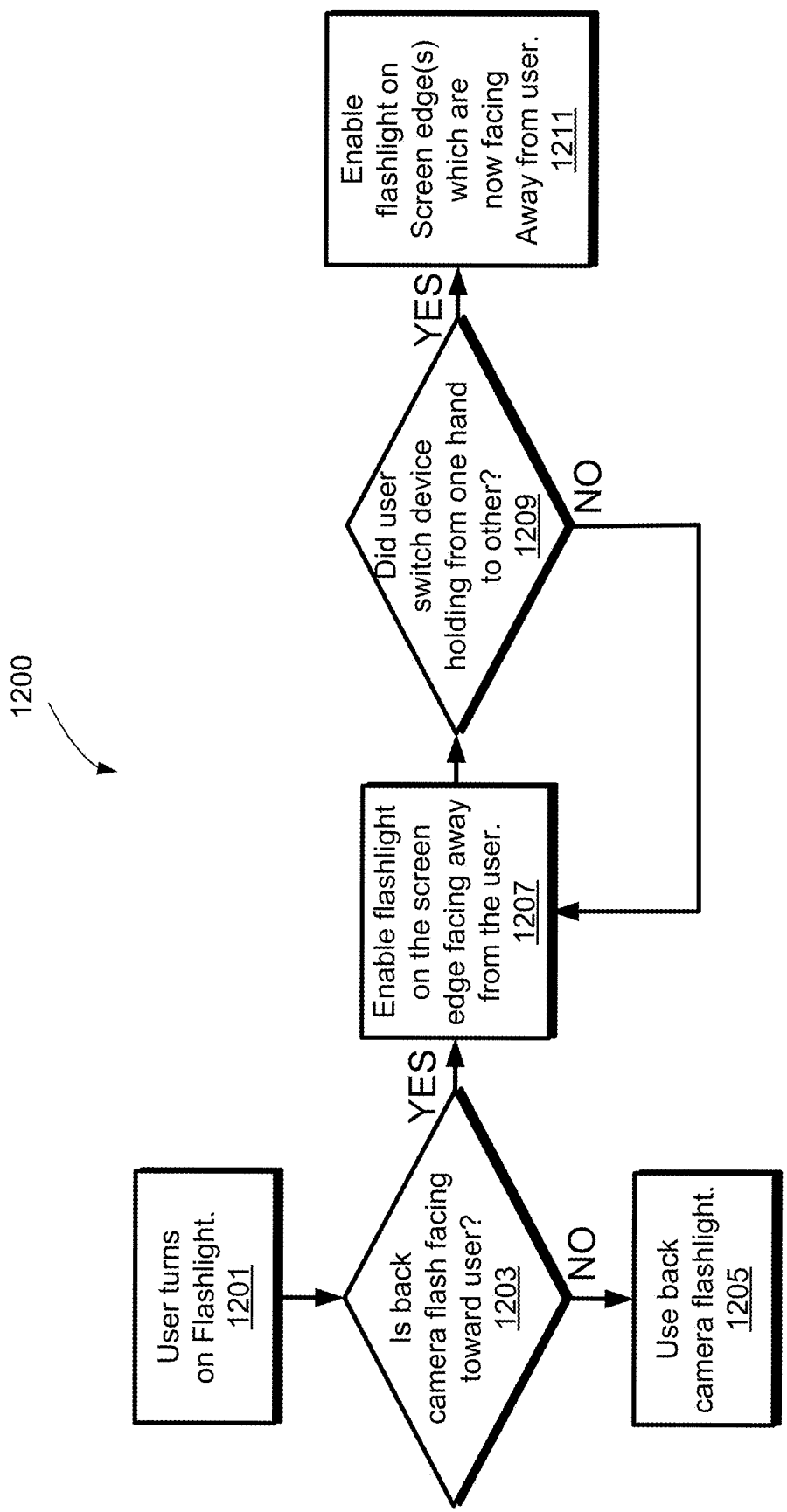
FIG. 12 is a flowchart showing a process for managing a flashlight function when using edge lighting as an alternative to the device's regular flashlight in accordance with an embodiment of the disclosed principles.

The flow chart of FIG. 12 shows a process 1200 for managing the flashlight function when using edge lighting as a possible alternative to the device's regular flashlight. At stage 1201 of the process 1200, the device detects that the user has turned on the device flashlight function, either by menu selection or gesture. The device then determines at stage 1203 whether the back flash is facing toward the user (e.g., such that the flash itself would be directly visible to the user). If it is determined that the back flash is not facing the user, then the device turns on the back flash light at stage 1205.

Otherwise, the process flows to stage 1207, wherein the device enables a flashlight on the screen edge facing away from the user. While the edge lighting is on in this manner, the device detects at stage 1209 whether the user has switched hands for holding the device, and if so, the device enables a flashlight on the new screen edge facing away from the user at stage 1211. Otherwise, the process loops back to stage 1207 to continue with the currently lit edge.

In an embodiment, with the device display potentially extending onto the device edges, the device may modify the edge portions of the display to place virtual actionable elements in locations appropriate to the user's hold and hand size. For example, when the user is holding the device, he or she can double tap the edge in a specific area to launch a specific shortcut. As another example, when the user is using the camera and holding the phone in a landscape orientation, he or she may be able to tap on the right or left screen edge area to take a picture. Similarly, when the user is playing a game and holding the phone in a landscape orientation, he/she may be able to tap on the left or right screen edge for a left/right control, e.g., to or shoot. In an embodiment, to avoid false touch detection, virtual buttons on edge screen areas are only enabled for certain applications or systems.

The device may thus personalize the layout of actionable items on edge screen areas. In an embodiment, this entails determining that the device has touch enabled display regions on one or more edges as a continuation of the primary display or as a secondary display and determining that the device is being held by a user's hand covering part of the edges while a portion of the edge remains uncovered. Based on the holding position, the user's viewing position and the user's hand size, the potential uncovered areas/regions in the edge screen sections are determined as places where a user can easily tap by thumb or other finger. The device then provides a personalize layout of actionable elements in the regions just identified and completes the action associated with such virtual buttons.

Figure 13:
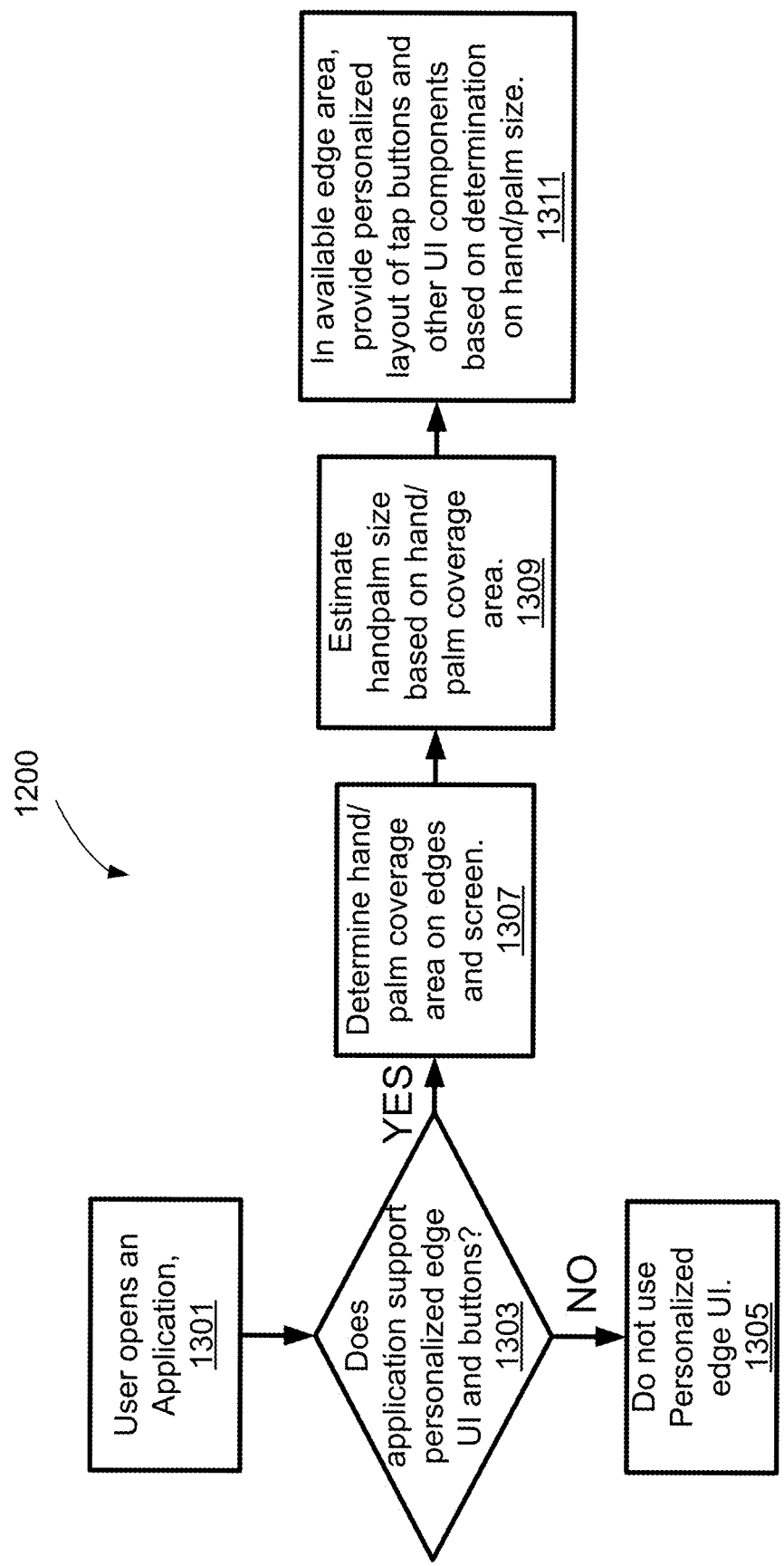
FIG. 13 is a flowchart showing a process for personalizing a layout of actionable items on edge screen areas in accordance with an embodiment of the disclosed principles.

FIG. 13 shows a flowchart of a process 1300 for personalizing the layout of actionable items on edge screen areas. At stage 1301 of the process 1300, the device detects that the user has opened an application, and at stage 1303, determines whether the application supports personalized edge UI and buttons.

If the application does not support personalized edge UI and buttons, then the process 1300 flows to stage 1305, wherein the device uses default UI placements and does not employ personalized edge UI. Otherwise, if the application does support personalized edge UI and buttons, the process 1300 flows from stage 1303 to stage 1307, wherein the device determine the hand/palm coverage area on the screen including the edge screen areas. The device uses this coverage determination at stage 1309 to estimate the user's hand and palm size. Finally at stage 1311, the device provides a customized layout of tap buttons and other UI components in the uncovered edge screen areas based on the determined hand and palm size.

It will be appreciated that a similar process would be followed for virtual buttons applicable at a system level, independent of a specific app. Such buttons can be shown irrespective of which app is open, as long as device display is on and user is holding the phone.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The invention claimed is:

1. A method for generating a personalizable user interface (UI) component layout on a curved screen on a mobile electronic communication device, the curved screen having a front screen display surface and a plurality of edge screen display surfaces, the method comprising:
    detecting at the mobile electronic communication device that a device user has opened an application on the mobile electronic communication device;
    determining whether the application opened by the device user supports placement of UI components on at least one edge screen display surface of the plurality of edge screen display surfaces; and
    placing one or more UI components of the application in accordance with a default layout when it is determined that the application does not support placement of UI components on edge screen display surfaces, and otherwise determining a coverage area where the front screen display surface and the plurality of edge screen display surfaces are covered by a user hand, estimating a user hand size based on the coverage area to identify an uncovered area where one or more portions of the plurality of edge screen display surfaces remain uncovered, and placing the one or more UI components in the uncovered area of at least one of the plurality of edge screen display surfaces most reachable by the device user from the coverage area based on the user hand size.

2. The method according to claim 1, wherein the one or more UI components include a virtual button.

3. The method according to claim 1, wherein the one or more UI components include a virtual slider.

4. The method according to claim 1, wherein determining a coverage area on the front screen display surface and the plurality of edge screen display surfaces further comprises determining the coverage area based on a viewing position of the device user.

5. The method according to claim 1, further comprising determining that the device user has touched at least one UI component located on an edge screen display surface.

6. The method according to claim 5, further comprising executing an action associated with the at least one touched UI component.

7. A mobile electronic communication device comprising:
    a front screen display surface;
    a plurality of edge screen display surfaces; and
    a processor configured to detect at the mobile electronic communication device that a notification has been received, determine whether the notification should be displayed on the front screen display surface or on one or more edge screen display surfaces of the plurality of edge screen display surfaces, and if the notification is to be displayed on the one or more edge screen display surfaces of the plurality of edge screen display surfaces, determine a coverage area where the plurality of edge screen display surfaces are covered by user hand, identify an uncovered area where one or more portions of the plurality of edge screen display surfaces remain uncovered, and if the uncovered area completely spans at least one edge screen display surface of the plurality of edge screen display surfaces, present the notification in the uncovered area completely spanning the at least one edge screen display surface of the plurality of edge screen display surfaces, and otherwise, if the coverage area at least partially spans every edge screen display surface of the plurality of edge screen display surfaces, present the notification on a selected edge screen display surface that is least covered by the coverage area.

8. The mobile electronic communication device according to claim 7, the processor presenting the notification in the uncovered area completely spanning the at least one edge screen display surface of the plurality of edge screen display surfaces or, otherwise, presenting the notification on the selected edge screen display surface that is least covered by the coverage area only when at least one user authenticated as an owner of the mobile electronic communication device is proximate with the mobile electronic communication device.

9. The mobile electronic communication device according to claim 7, wherein the processor determines whether the notification is to be displayed on one or more edge screen display surfaces of the plurality of edge screen display surfaces as a function of a detected holding direction of the mobile electronic communication device.

10. The mobile electronic communication device according to claim 7, wherein determining a coverage area on the front screen display surface and the plurality of edge screen display surfaces further comprises determining the coverage area based on a viewing position of a user.

11. The mobile electronic communication device according to claim 7, wherein the processor is further configured to determine a known direction of a user of the mobile electronic communication device as a function of the uncovered area.

12. The mobile electronic communication device according to claim 11, wherein the processor is further configured to mute a notification in response to an edge gesture occurring at the uncovered area completely spanning the at least one edge screen display surface of the plurality of edge screen display surfaces or, otherwise, at the selected edge screen display surface that is least covered by the coverage area.

13. A non-transitory computer-readable medium having thereon computer-executable instructions for generating a personalizable user interface (UI) component layout on a mobile electronic communication device having a front screen display surface and a plurality of edge screen display surfaces, the computer-executable instructions including instructions for:
  detecting that a device user has opened an application on the mobile electronic communication device;
  determining whether the application opened by the device user supports placement of U components on at least one edge screen display of the plurality of edge screen display surfaces; and
  placing one or more UI components associated with the application in accordance with a default layout if the application does not support placement of UI components on edge screen display surfaces, and otherwise determining a coverage area where the front screen display surface and the plurality of edge screen display surfaces are covered by a user hand, estimating a user hand size based on the coverage area to identify an uncovered areas where one or more portions of the plurality of edge screen display surfaces remain uncovered, placing the one or more UI components in the uncovered area of at least one of the plurality of edge screen display surfaces reachable by the device user from the coverage area based on the user hand size, and expand content presented on the front screen display surface to the uncovered area of the at least one of the plurality of edge screen display surfaces in areas other than where the one or more UI components are presented.

14. The non-transitory computer-readable medium according to claim 13, wherein the one or more UI components include at least one of a virtual button and a virtual slider.

15. The non-transitory computer-readable medium according to claim 13, wherein the computer-executable instructions for determining a coverage area on the front screen display surface and the plurality of edge screen display surfaces further include instructions for determining the coverage area based on a viewing position of the device user.

16. The non-transitory computer-readable medium according to claim 13, wherein the computer-executable instructions further include instructions for determining that the device user has touched at least one UI component located on an edge screen display surface.

17. The non-transitory computer-readable medium according to claim 16, wherein the computer-executable instructions further include instructions for executing an action associated with the at least one touched UI component.

* * * * *